US012463344B2

(12) United States Patent
Ogawa et al.

(10) Patent No.: US 12,463,344 B2
(45) Date of Patent: Nov. 4, 2025

(54) SLOT ANTENNA

(71) Applicant: DENSO TEN Limited, Hyogo (JP)

(72) Inventors: Shota Ogawa, Kobe (JP); Toshihiro Shimizu, Kobe (JP)

(73) Assignee: DENSO TEN Limited, Kobe (JP)

( * ) Notice: Subject to any disclaimer, the term of this patent is extended or adjusted under 35 U.S.C. 154(b) by 191 days.

(21) Appl. No.: 18/190,217

(22) Filed: Mar. 27, 2023

(65) Prior Publication Data

US 2024/0113440 A1 Apr. 4, 2024

(30) Foreign Application Priority Data

Sep. 30, 2022 (JP) ................................ 2022-158175

(51) Int. Cl.
*H01Q 1/32* (2006.01)
*H01Q 13/10* (2006.01)

(52) U.S. Cl.
CPC ........... *H01Q 13/10* (2013.01); *H01Q 1/3275* (2013.01)

(58) Field of Classification Search
CPC ........ H01Q 13/10; H01Q 1/3275; H01Q 1/42; H01Q 13/16
See application file for complete search history.

(56) References Cited

U.S. PATENT DOCUMENTS

2016/0197398 A1* 7/2016 Scheim .................. H01Q 1/286 343/713
2020/0185820 A1* 6/2020 Shin ..................... H01Q 1/3208
2022/0059923 A1* 2/2022 Tanaka ..................... H01Q 1/22
2024/0088566 A1* 3/2024 Somersalo ............. H01Q 1/288
2024/0170836 A1* 5/2024 Kim ..................... H01Q 1/3275

FOREIGN PATENT DOCUMENTS

JP 2005-244981 A 9/2005
JP 2009-246795 A 10/2009
JP 2020-100352 A 7/2020

* cited by examiner

*Primary Examiner* — David E Lotter
(74) *Attorney, Agent, or Firm* — Oliff PLC

(57) ABSTRACT

The invention is directed to a slot antenna including; a slot, that is an opening having a slit shape, formed at a plane metal sheet which is a part of a vehicle body; an electric power supply portion that is disposed at a vicinity of the slot, and that supplies electric power to the slot; and a cover that is provided to cover the opening or a slot antenna including; a cover that is provided to cover an opening provided at a metal sheet constituting an outer plate of a vehicle, wherein the cover is made of a dielectric material; and a conductor pattern formed on the cover, wherein the conductor pattern forms a slot.

9 Claims, 17 Drawing Sheets

SLOT ANTENNA

CROSS-REFERENCE TO RELATED APPLICATION

This application is based on and claims priority under 35 USC 119 from Japanese Patent Application No. 2022-158175 filed on Sep. 30, 2022.

TECHNICAL FIELD

The present invention relates to a slot antenna.

BACKGROUND ART

In the related art, for example, regarding an antenna device mounted on a vehicle, a technique has been proposed in which an opening portion of a vehicle body functions as a slot antenna (see, for example, JP2020-100352A).

SUMMARY OF INVENTION

In the related-art technique, an antenna can be prevented from protruding to an outside of the vehicle. However, in the related-art technique, for example, in a case where the opening portion is provided on a roof of the vehicle or the like, the opening portion is conspicuous from the outside, and the appearance of the vehicle may be impaired.

The present invention has been made in view of the above circumstances, and an object of the present invention is to provide a slot antenna that improves an aesthetic appearance of a vehicle while the antenna is prevented from protruding from the vehicle.

A slot antenna according to an aspect of the embodiment is a slot antenna in which power is supplied to a slot that is a slit-shaped opening provided at a metal sheet constituting an outer plate of a vehicle. The slot antenna includes a cover. The cover covers an outer surface side of the opening.

According to the aspect of the embodiment, it is possible to improve the aesthetic appearance of the vehicle while preventing the antenna from protruding from the vehicle.

DETAILED DESCRIPTION OF THE INVENTION

Hereinafter, a slot antenna according to an embodiment will be described in detail with reference to the accompanying drawings. The present invention is not limited to the embodiments.

First Embodiment

Figure 1:
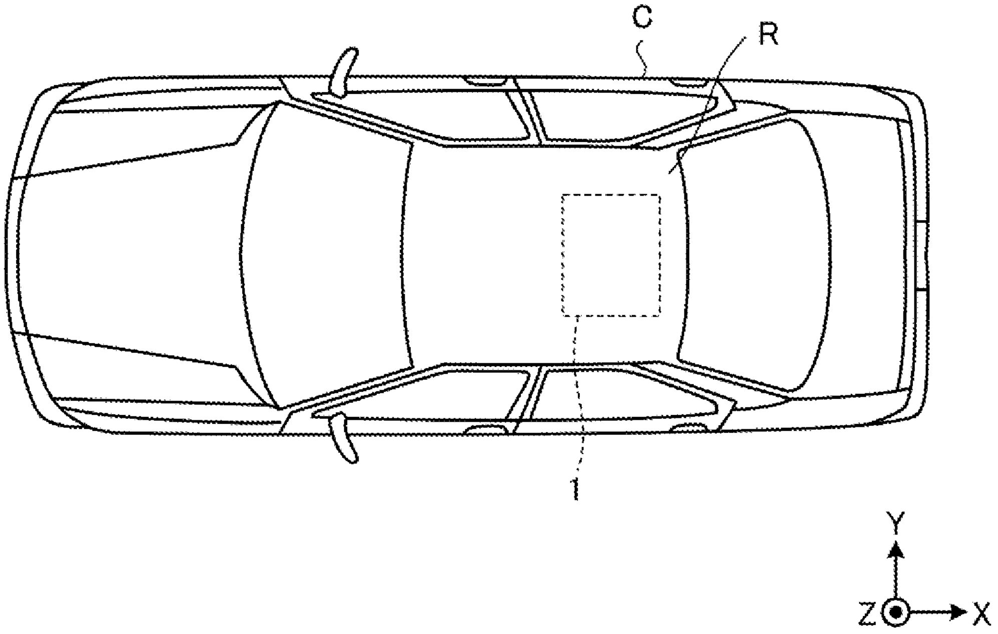
FIG. 1 is a diagram showing a mounting position of a slot antenna according to a first embodiment.

FIG. 1 is a diagram showing a mounting position of a slot antenna 1 according to a first embodiment. As shown in FIG. 1, the slot antenna 1 according to the embodiment is mounted on a vehicle C. For example, the slot antenna 1 is mounted on a roof R of the vehicle C.

A frequency band of radio waves received by the slot antenna 1 is, for example, a VHF band (30 MHz to 300 MHz) or a UHF band (300 MHz to 3000 MHz), and is a frequency band including broadcast waves such as FM (Frequency Modulation) radio broadcast, AM (Amplitude Modulation) radio broadcast, DAB (Digital Audio Broadcast), and DTV (Digital Television).

Further, the slot antenna 1 may be an antenna used for communication such as V2X (Vehicle to Everything) and GNSS (Global Navigation Satellite System).

In the following figures including FIG. 1, three orthogonal coordinate axes are shown. Specifically, an X axis corresponds to a traveling direction (front-rear direction) of the vehicle C, a positive side is defined as a rear side, and a negative side is defined as a front side. A Y axis corresponds to a vehicle width direction of the vehicle C, a positive side is defined as a vehicle right side, and a negative side is defined as a vehicle left side. A Z axis corresponds to a height direction of the vehicle C, a positive side is defined as an upper side, and a negative side is defined as a lower side.

Figure 2:
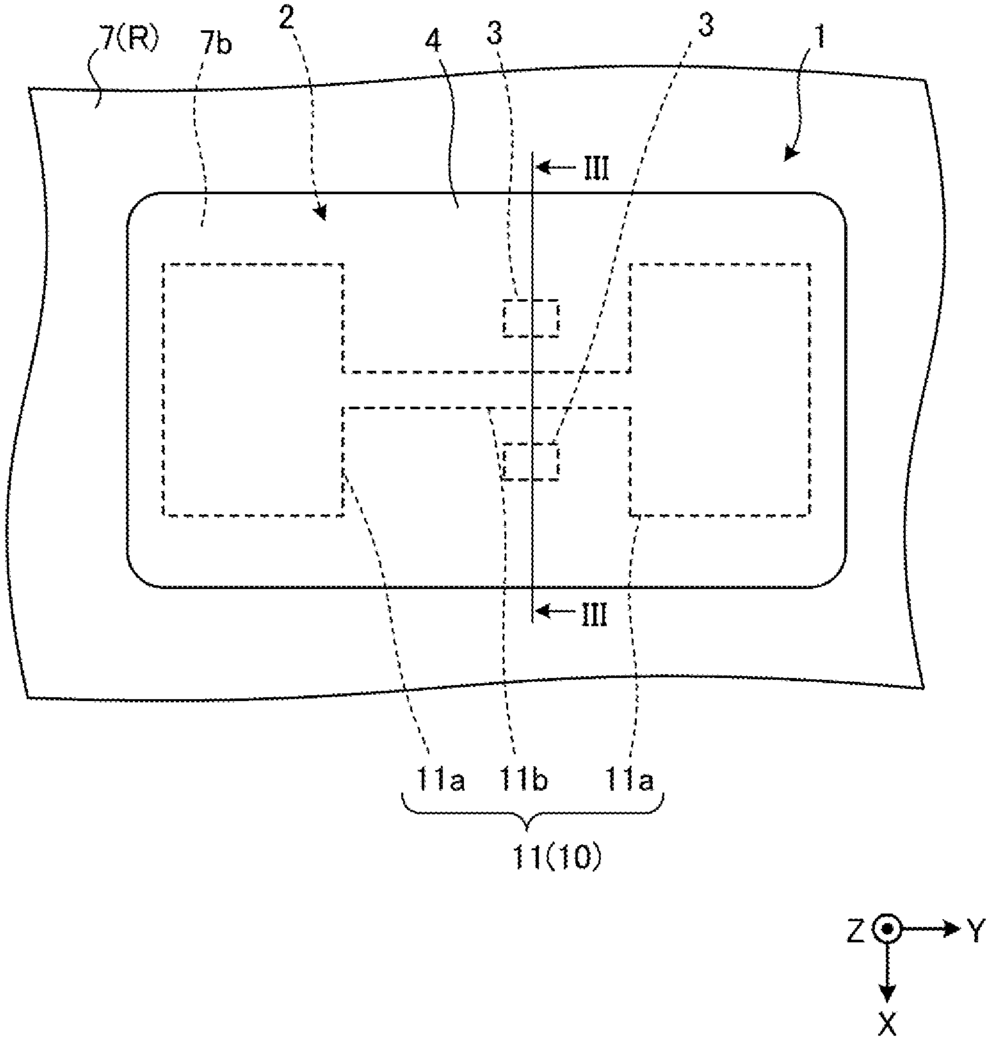
FIG. 2 is a plan view schematically showing the slot antenna according to the first embodiment.
Figure 3:
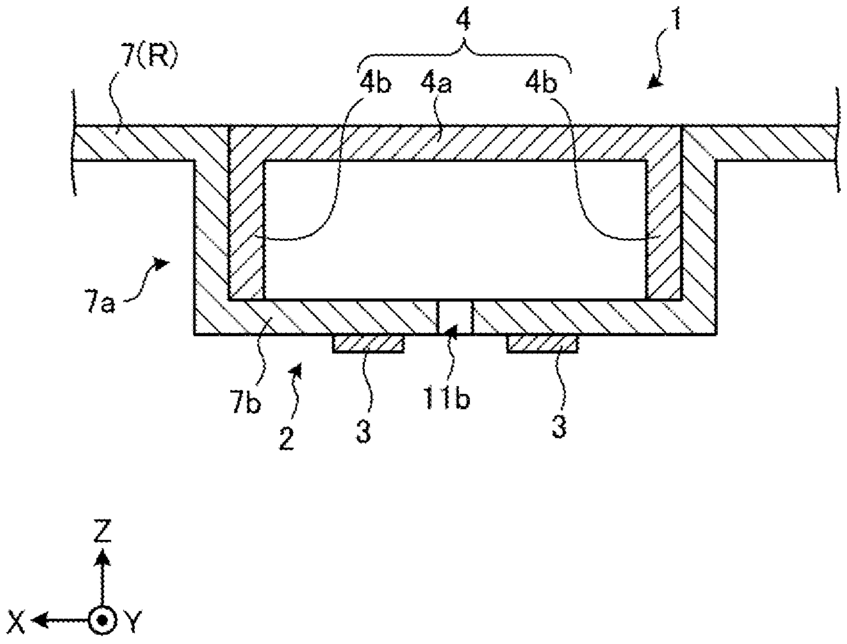
FIG. 3 is a cross-sectional view taken along a line III-III in FIG. 2.

Next, a configuration example of the slot antenna 1 according to the first embodiment will be described with reference to FIGS. 2 and 3. FIG. 2 is a plan view schematically showing the slot antenna 1 according to the first embodiment. FIG. 3 is a cross-sectional view taken along a line III-III of FIG. 2. The slot antenna 1 includes a slot portion 2, feeding points 3, and a cover 4.

The slot portion 2 is formed by a metal sheet 7. The metal sheet 7 constitutes an outer plate of the vehicle C. The metal sheet 7 constitutes the roof R. The slot portion 2 is formed by the metal sheet 7 constituting the outer plate of the vehicle C. The metal sheet 7 has a recess portion 7*a*. The recess portion 7*a* is recessed toward a vehicle interior side the vehicle C. The recess portion 7*a* extends in the vehicle width direction (Y-axis direction) of the vehicle C. The slot portion 2 is formed in the recess portion 7*a*. Specifically, the slot portion 2 is formed in a bottom portion 7*b* of the recess portion 7*a*.

A slit-shaped opening portion 10 (opening) is formed in the slot portion 2. The slot portion 2 is provided with a slot 11. Specifically, the slit-shaped opening portion 10 functions as the slot 11 that receives radio waves from an outside. In other words, the slot 11 is a slit-shaped opening provided at the metal sheet 7 constituting the outer plate of the vehicle C. The opening portion 10 is provided at the bottom portion 7*b* (bottom surface) of the recess portion 7*a*. In the slot antenna 1, power is supplied to the slot 11.

The slot 11 (opening portion 10) extends in the vehicle width direction (Y-axis direction) of the vehicle C. The slot 11 includes two end portions 11*a* and a central portion 11*b*.

The recess portion 7*a* may extend in the traveling direction (X-axis direction) of the vehicle C. The slot 11 may extend in the traveling direction of the vehicle C.

Each of the two end portions 11*a* are provided at both ends of the slot 11 in a longitudinal direction thereof (Y-axis direction). Each of the two end portions 11*a* is formed in a rectangular shape.

The central portion 11*b* is provided between the two end portions 11*a* and connects the two end portions 11*a*. The central portion 11*b* is formed in a rectangular shape. The central portion 11*b* is connected to a vicinity of a center of each of the two end portions 11*a* in a lateral direction (X-axis direction) of the slot 11. A length of the central portion 11*b* in the lateral direction of the slot 11 is shorter than a length of each of the two end portions 11*a* in the lateral direction of the slot 11. That is, the slot 11 is formed in a substantially dumbbell shape in a plan view.

By forming the slot 11 in a substantially dumbbell shape, the slot antenna 1 can receive radio waves in a wide frequency band while shortening a length of the slot 11 in the vehicle width direction, thereby improving an antenna performance.

The feeding points 3 are disposed on both sides of the slot 11 in a width direction thereof (X-axis direction). Specifically, the feeding points 3 are disposed on both sides of the central portion 11*b* in the width direction (X-axis direction) of the central portion 11*b*. The feeding points 3 are connected to the metal sheet 7 in which the central portion 11*b* is formed. One of the feeding points 3 is connected to a central conductor of a coaxial cable which is a feeding line. The other of the feeding points 3 is connected to an outer conductor of the coaxial cable. The outer conductor surrounds the central conductor. In the slot antenna 1, power is supplied to the slot 11 via the feeding points 3.

The cover 4 is made of a dielectric (typically, an insulator). The cover 4 is made of resin, for example. The cover 4 is a garnish made of resin. The cover 4 covers an outer surface side of the opening portion 10. That is, the cover 4 covers the outer surface side of the slot 11. The outer surface side of the opening portion 10 is a vehicle exterior side of the vehicle C. The cover 4 closes the recess portion 7*a*. The cover 4 has a U-shaped cross section including an upper surface portion 4*a* and side wall portions 4*b*. The side wall portions 4*b* are inserted into the recess portion 7*a*. The side wall portions 4*b* of the cover 4 are fitted into the recess portion 7*a* to close the recess portion 7*a*. The cover 4 is fixed to the metal sheet 7.

Preferably, a gap between the metal sheet 7 and the cover 4 is filled with an inclusion such as rubber or caulking material so as to prevent water or the like from entering and make a step between the metal sheet 7 and the cover 4 less noticeable.

A shape of the cover 4 is provided according to a shape of the metal sheet 7 around the recess portion 7*a*. That is, the shape of the cover 4 is provided according to a shape of the roof R. For example, the cover 4 is provided so as not to protrude to an outside of the vehicle C beyond the metal sheet 7 around the recess portion 7*a*. Specifically, the upper surface portion 4*a* is flush with the outer plate of the vehicle C. Further, the cover 4 is provided so as not to be recessed toward the vehicle interior side of the vehicle C with respect to the metal sheet 7 around the recess portion 7*a*. When the roof R has a curved shape and the metal sheet 7 around the recess portion 7*a* has a curved shape, the shape of the cover 4 is curved according to the curved shape of the roof R.

Figure 4:
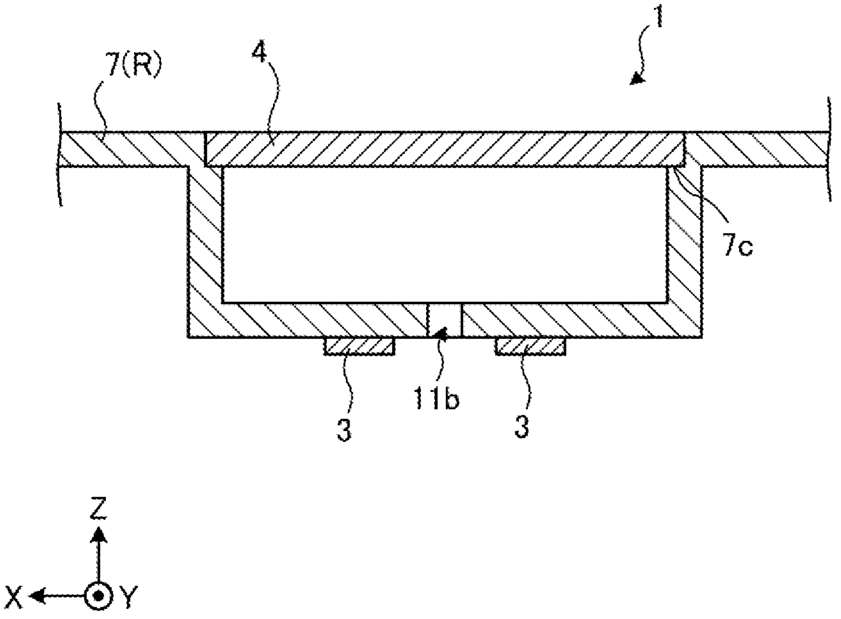
FIG. 4 is a cross-sectional view schematically showing a slot antenna according to a modification.

As shown in FIG. 4, the cover 4 may have a plate shape. The plate-shaped cover 4 is fitted to a step portion 7*c* (stepped portion) formed in the metal sheet 7. The step portion 7*c* is provided at an edge of the recess portion 7*a*. The step portion 7*c* is provided such that a depth of the recess portion 7*a* increases stepwise. The cover 4 closes the recess portion 7*a* by being fitted into the step portion 7*c*. FIG. 4 is a cross-sectional view schematically showing the slot antenna 1 according to a modification.

Accordingly, the slot antenna 1 can prevent the cover 4 from being conspicuous in an appearance of the vehicle C. Therefore, the slot antenna 1 can improve an aesthetic appearance of the vehicle C.

In the slot antenna 1, power is supplied to the slot 11 which is the slit-shaped opening portion 10 provided at the metal sheet 7 constituting the outer plate of the vehicle C. The slot antenna 1 includes the cover 4. The cover 4 covers an outer surface side of the opening portion 10.

Accordingly, the slot antenna 1 can be prevented from protruding from the vehicle C by covering the outer surface side of the opening portion 10 with the cover 4 of the slot antenna 1. The slot antenna 1 can prevent the appearance of the vehicle C from being impaired and improve the aesthetic appearance of the vehicle C.

The metal sheet 7 includes the recess portion 7*a*. The recess portion 7*a* is recessed toward a vehicle interior side the vehicle C. The opening portion 10 is provided at the bottom portion 7*b* of the recess portion 7*a*. The cover 4 closes the recess portion 7*a*.

Accordingly, the slot antenna 1 can prevent the recess portion 7*a* from being conspicuous in the appearance of the vehicle C. Therefore, the slot antenna 1 can improve an aesthetic appearance of the vehicle C.

The cover 4 has a U-shaped cross section including the upper surface portion 4*a* and the side wall portions 4*b*, and the side wall portions 4*b* are fitted into the recess portion 7*a* to close the recess portion 7*a*.

Accordingly, in the slot antenna 1, the cover 4 can be prevented from coming off from the recess portion 7*a* due to the side wall portions 4*b*.

The upper surface portion 4*a* of the cover 4 is flush with the outer plate of the vehicle C.

Accordingly, the slot antenna 1 can prevent the cover 4 from being conspicuous in an appearance of the vehicle C. Therefore, the slot antenna 1 can improve an aesthetic appearance of the vehicle C.

Further, the opening portion 10 is provided at the metal sheet 7 constituting the roof R of the vehicle C.

Accordingly, the number of components of the slot antenna 1 can be reduced.

Figure 5:
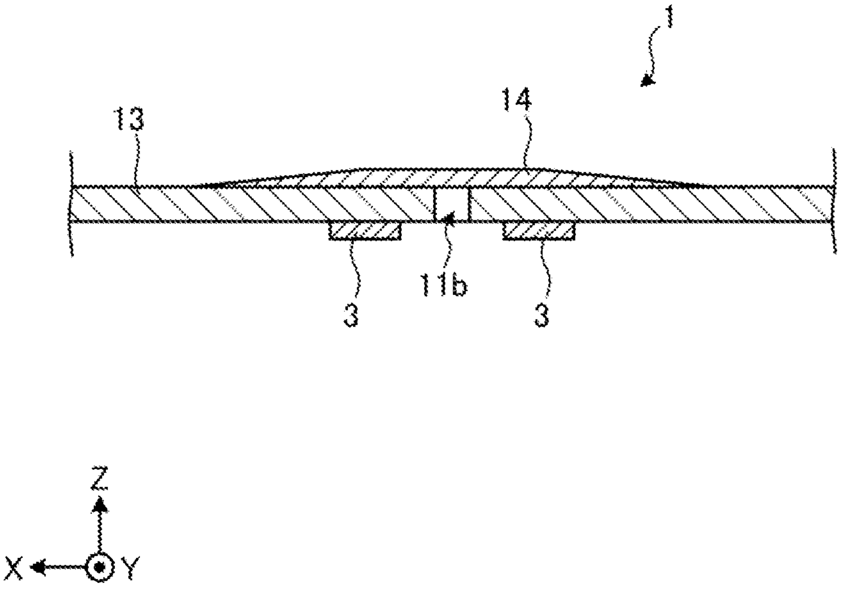
FIG. 5 is a cross-sectional view schematically showing a slot antenna according to a modification.

An example of the slot antenna 1 in which the recess portion 7*a* is provided at the metal sheet 7 and the slot 11 is provided in the bottom portion 7*b* of the recess portion 7*a* has been described, but the present invention is not limited thereto. As shown in FIG. 5, the slot 11 of the slot antenna 1 may be provided at a metal sheet 13 having no recess portion. The cover 4 protrudes from the metal sheet 13 to the outside of the vehicle C. FIG. 5 is a cross-sectional view schematically showing the slot antenna 1 according to a modification.

Figure 6:
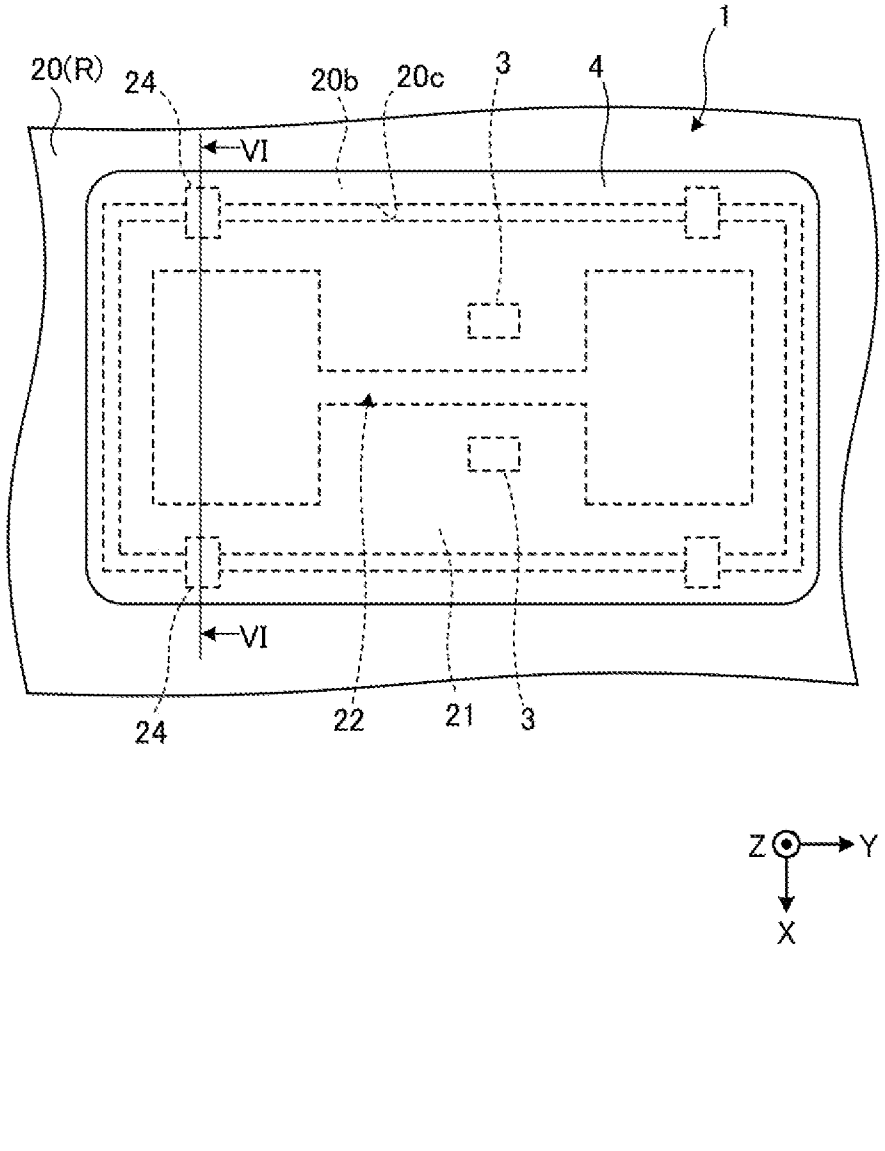
FIG. 6 is a plan view schematically showing a slot antenna according to a modification.
Figure 7:
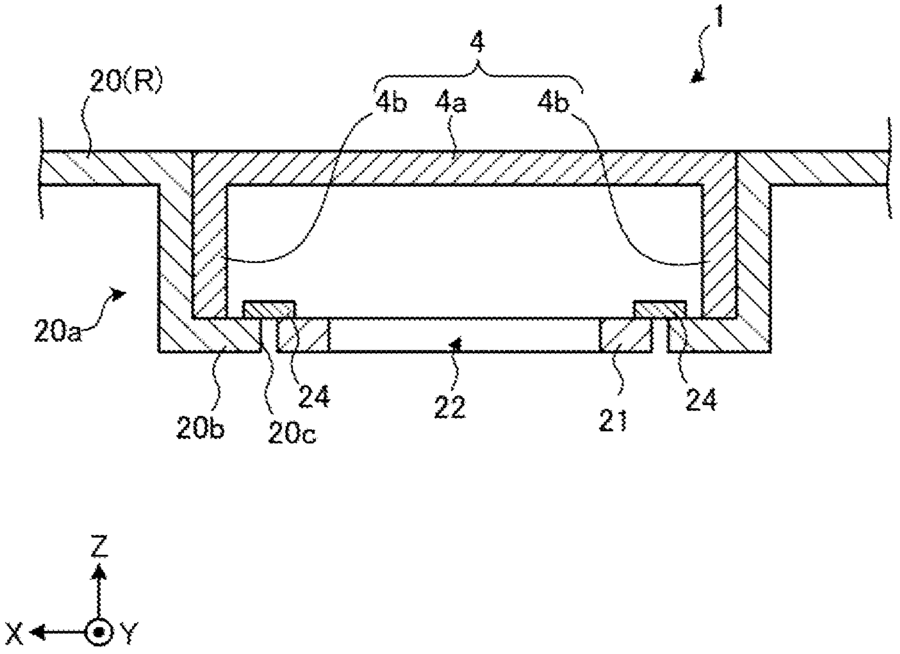
FIG. 7 is a cross-sectional view taken along a line VI-VI of FIG. 6.

Further, an example of the slot antenna 1 in which the opening portion 10 is provided at the recess portion 7*a* of the metal sheet 7 and the opening portion 10 functions as the slot 11 has been described, but the present invention is not limited thereto. As shown in FIGS. 6 and 7, in the slot antenna 1, an opening portion 20*c* may be formed in a bottom portion 20*b* of a recess portion 20*a* of a metal sheet 20, and a conductor plate 21 including a slot 22 may be provided at the opening portion 20*c*. FIG. 6 is a plan view schematically showing the slot antenna 1 according to a modification. FIG. 7 is a cross-sectional view taken along a line VI-VI of FIG. 6.

The opening portion 20*c* has a rectangular shape. The opening portion 20*c* extends in the vehicle width direction (Y-axis direction) of the vehicle C.

The conductor plate 21 is, for example, a plate-shaped metal member. The conductor plate 21 is flush with the opening portion 20*c*. The conductor plate 21 is flush with the bottom portion 20*b* of the metal sheet 20 in which the opening portion 20*c* is formed. The "flush" includes not only being completely flush but also being flush with an error of up to about several centimeters (for example, 5 cm).

The conductor plate 21 is connected to the metal sheet 20 by metal brackets 24. The conductor plate 21 is connected to the metal sheet 20 by a plurality of brackets 24. The conductor plate 21 is electrically connected to the metal sheet 20 by the brackets 24. The slot 22 is formed at the conductor plate 21. The slot 22 extends in a longitudinal direction (Y-axis direction) of the opening portion 20*c*. The slot 22 has a dumbbell shape. The conductor plate 21 functions as a slot portion.

The slot antenna 1 includes the conductor plate 21. The conductor plate 21 is electrically connected to the metal sheet 20, is provided at the opening portion 20*c*, and is flush with the opening portion 20*c*. The slot 22 extending in the longitudinal direction of the opening portion 20*c* is formed in the conductor plate 21.

Accordingly, in the slot antenna 1, the slot 22 can be formed by providing the rectangular opening portion 20*c* in the metal sheet 20 and providing the conductor plate 21 in the opening portion 20*c*. Therefore, metal sheet processing for providing the slot antenna 1 is facilitated. Further, since the slot antenna 1 is formed by attaching the conductor plate 21 in which the slot 22 is formed to the opening portion 20*c*, the assembly work of the slot antenna 1 is facilitated. Further, by making the conductor plate 21 flush with the opening portion 20*c*, the conductor plate 21 of the slot antenna 1 can be prevented from protruding from the vehicle C. Therefore, the slot antenna 1 can prevent the appearance of the vehicle C from being impaired and improve the aesthetic appearance of the vehicle C.

Figure 8:
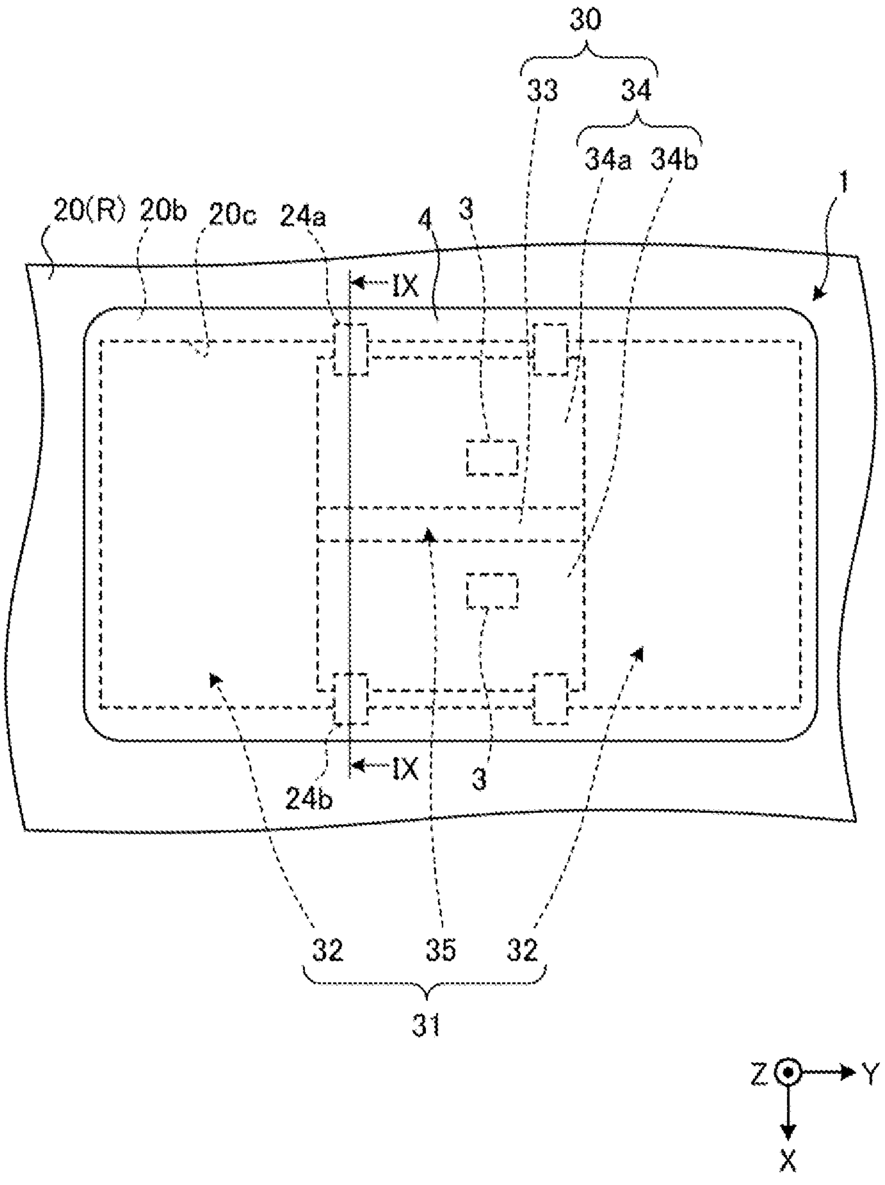
FIG. 8 is a plan view schematically showing a slot antenna according to a modification.
Figure 9:
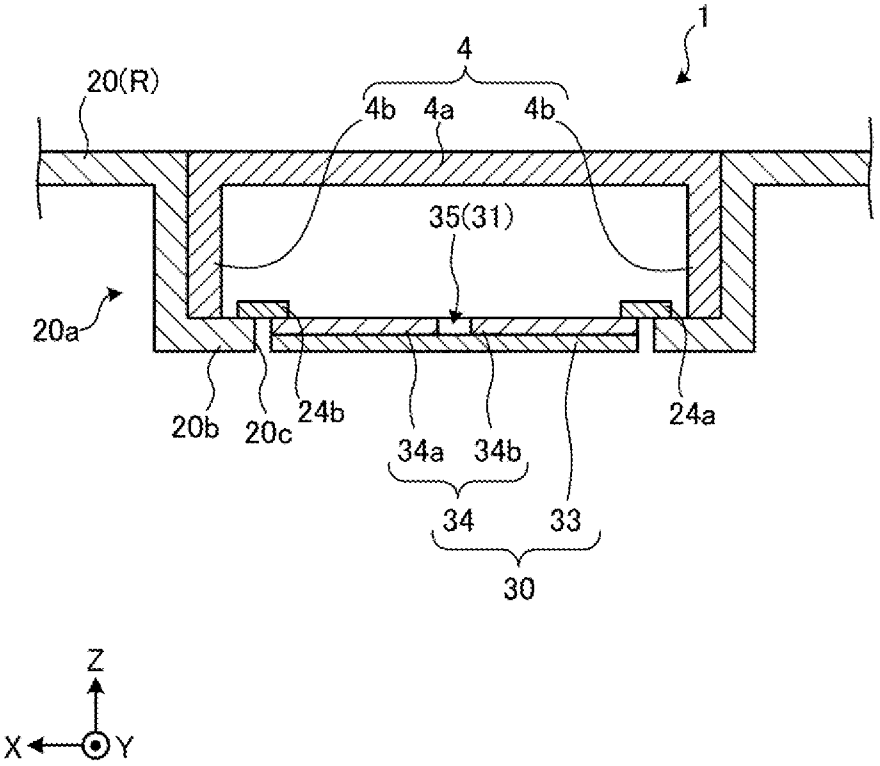
FIG. 9 is a cross-sectional view taken along a line IX-IX in FIG. 8.

Further, as shown in FIGS. 8 and 9, in the slot antenna 1, a slot 31 may be formed in the rectangular opening portion 20*c* by disposing a conductor plate 30 in the opening portion 20*c*. FIG. 8 is a plan view schematically showing the slot antenna 1 according to a modification. FIG. 9 is a cross-sectional view taken along a line IX-IX of FIG. 8.

The conductor plate 30 is provided at a center of the opening portion 20*c* in the longitudinal direction (Y-axis direction). The conductor plate 30 is provided such that spaces 32 are formed between the opening portion 20*c* and both ends of the conductor plate 30 in the longitudinal direction of the opening portion 20*c*. Each of the spaces 32 has, for example, a rectangular shape in a plan view.

The conductor plate 30 is formed by, for example, laminating a conductor pattern 34 on a substrate 33. The substrate 33 is, for example, a substrate made of an insulator such as glass epoxy or ceramic. The conductor pattern 34 is printed on the substrate 33, for example. The conductor plate 30 can be formed by using a structure of a general printed wiring board. The conductor pattern 34 is connected to the metal sheet 7 by metal brackets. The conductor pattern 34 includes a first conductor pattern 34*a* and a second conductor pattern 34*b*.

The first conductor pattern 34*a* is formed in, for example, a rectangular shape. The first conductor pattern 34*a* is electrically connected to the metal sheet 20 by metal brackets 24*a*.

The second conductor pattern 34*b* is formed in, for example, a rectangular shape. The second conductor pattern 34*b* is electrically connected to the metal sheet 20 by metal brackets 24*b*.

The conductor plate 30 includes a slit 35 between the first conductor pattern 34*a* and the second conductor pattern 34*b*. The slit 35 is a non-laminated portion in which the conductor pattern 34 is not laminated on the substrate 33. The slit 35 extends in the longitudinal direction of the opening portion 20*c*. The slit 35 is provided linearly along the longitudinal direction of the opening portion 20*c*. The slit 35 is provided at a center of the conductor plate 30 in a lateral direction of the opening portion 20*c*. The slit 35 is connected to the spaces 32 provided on both sides in the longitudinal direction of the opening portion 20*c*.

The slot 31 having a dumbbell shape in a plan view is formed by the metal sheet 20 in which the opening portion 20*c* is formed and the conductor pattern 34 of the conductor plate 30. The slot 31 includes the spaces 32 and the slit 35. That is, a part of the slot 31 is formed in the conductor plate 30. The metal sheet 20 and the conductor plate 30 function as a slot portion.

Accordingly, metal sheet processing for providing the slot antenna 1 is facilitated. Further, since the slot antenna 1 is formed by attaching the conductor plate 30 in which the slit 35 is formed to the opening portion 20*c*, the assembly work of the slot antenna 1 is facilitated. Further, since the spaces 32 between the opening portion 20*c* and the conductor plate 30 functions as a part of the slot 31, it is possible to increase a length of the slot 31 in the longitudinal direction (Y-axis direction) of the opening portion 20*c* and in the lateral direction (X-axis direction) of the opening portion 20*c*. Therefore, the slot antenna 1 can efficiently receive radio waves in a low frequency band. That is, a receivable frequency band of the slot antenna 1 can be expanded.

Figure 10:
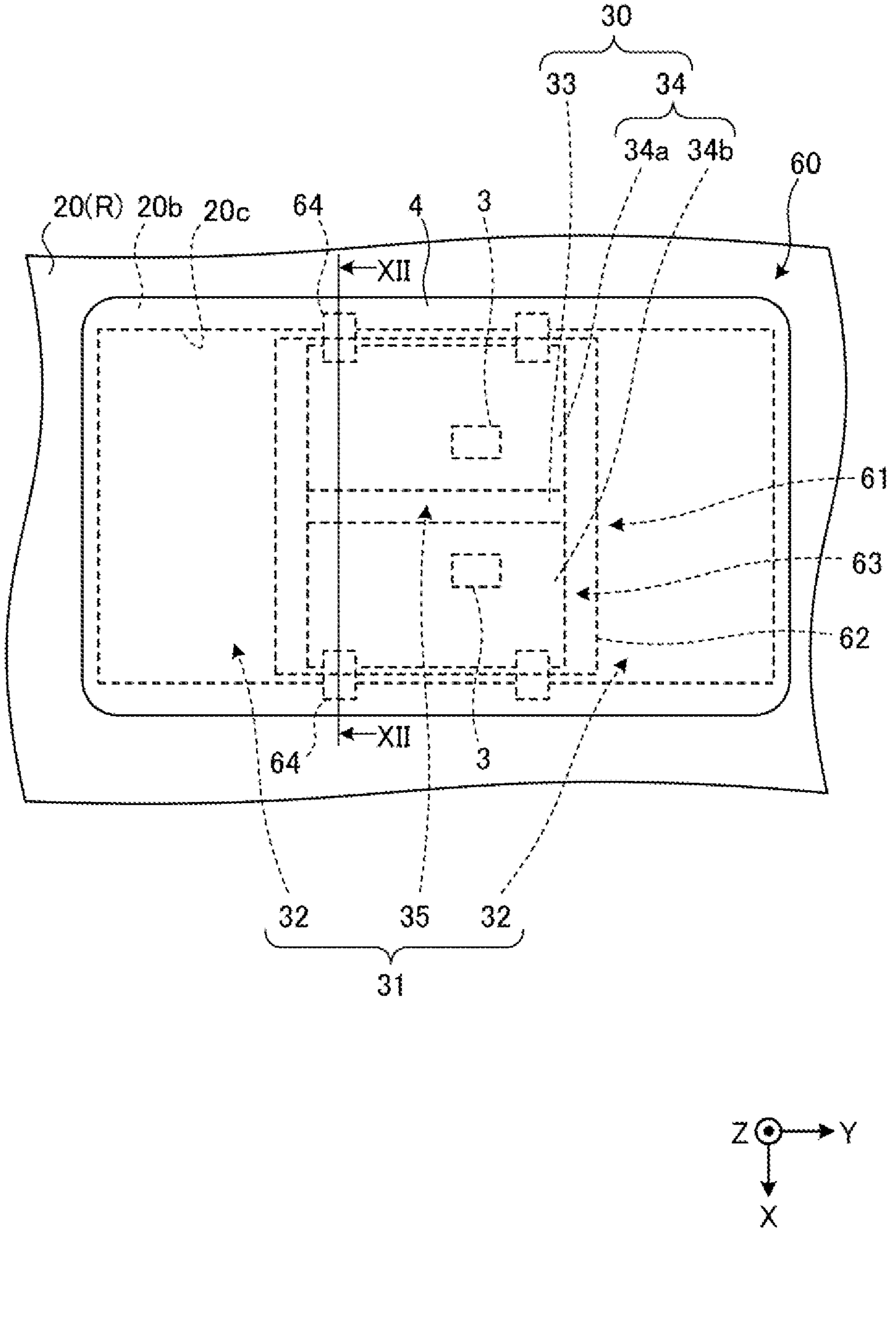
FIG. 10 is a plan view schematically showing a slot antenna according to a modification.

As shown in FIG. 10, a conductor pattern 41 of a conductor plate 40 may be formed such that a slit 42 is bent in an L shape. FIG. 10 is a plan view schematically showing the slot antenna 1 according to a modification. For example, a first conductor pattern 41*a* is formed in an L shape. A second conductor pattern 41*b* is formed in a rectangular shape.

The first conductor pattern 41*a* is connected to the metal sheet 20 by the metal brackets 24*a* on one end side in the lateral direction (X-axis direction) of the opening portion 20*c*. The first conductor pattern 41*a* is not connected to the metal sheet 20 on the other end side in the lateral direction of the opening portion 20*c*. The first conductor pattern 41*a* may be connected to the metal sheet 20 via an insulator on the other end side in the lateral direction of the opening portion 20*c*. Further, the first conductor pattern 41*a* may be connected to the metal sheet 20 by a bracket, which is made of an insulator, on the other end side in the lateral direction of the opening portion 20*c*.

The slit 42 includes a first slit 42*a* and a second slit 42*b*. That is, the conductor plate 40 includes the first slit 42*a* and the second slit 42*b*. The first slit 42*a* is a non-laminated portion in which the conductor pattern 41 is not laminated on the substrate 33. The second slit 42*b* is a non-laminated portion in which the conductor pattern 41 is not laminated on the substrate 33.

The first slit 42*a* is formed along the longitudinal direction (Y-axis direction) of the opening portion 20*c*. The second slit 42*b* is formed along the lateral direction (X-axis direction) of the opening portion 20*c*. One end of the second slit 42*b* is connected to the first slit 42*a*. The other end of the second slit 42*b* is connected to a third slit 43. The third slit 43 is a gap formed between the conductor plate 40 and the metal sheet 20. Specifically, the third slit 43 is a gap formed between the metal sheet 20 and an end portion of the first conductor pattern 41*a* that is not electrically connected to the metal sheet 20, in the lateral direction of the opening portion 20*c*.

A slot 45 includes the spaces 32, the first slit 42*a*, the second slit 42*b*, and the third slit 43.

The conductor plate 40 includes the first slit 42*a* and the second slit 42*b*. The first slit 42*a* is formed along the longitudinal direction of the opening portion 20*c*. The second slit 42*b* is formed along the lateral direction of the opening portion 20*c*. One end of the second slit 42*b* is connected to the first slit 42*a*. The other end of the second slit 42*b* is connected to the third slit 43 formed between the conductor plate 40 and the metal sheet 20.

Accordingly, in the slot antenna 1, a length of the slot 45 can be increased. Therefore, the slot antenna 1 can efficiently receive radio waves in a low frequency band. That is, a receivable frequency band of the slot antenna 1 can be expanded.

Second Embodiment

Figure 11:
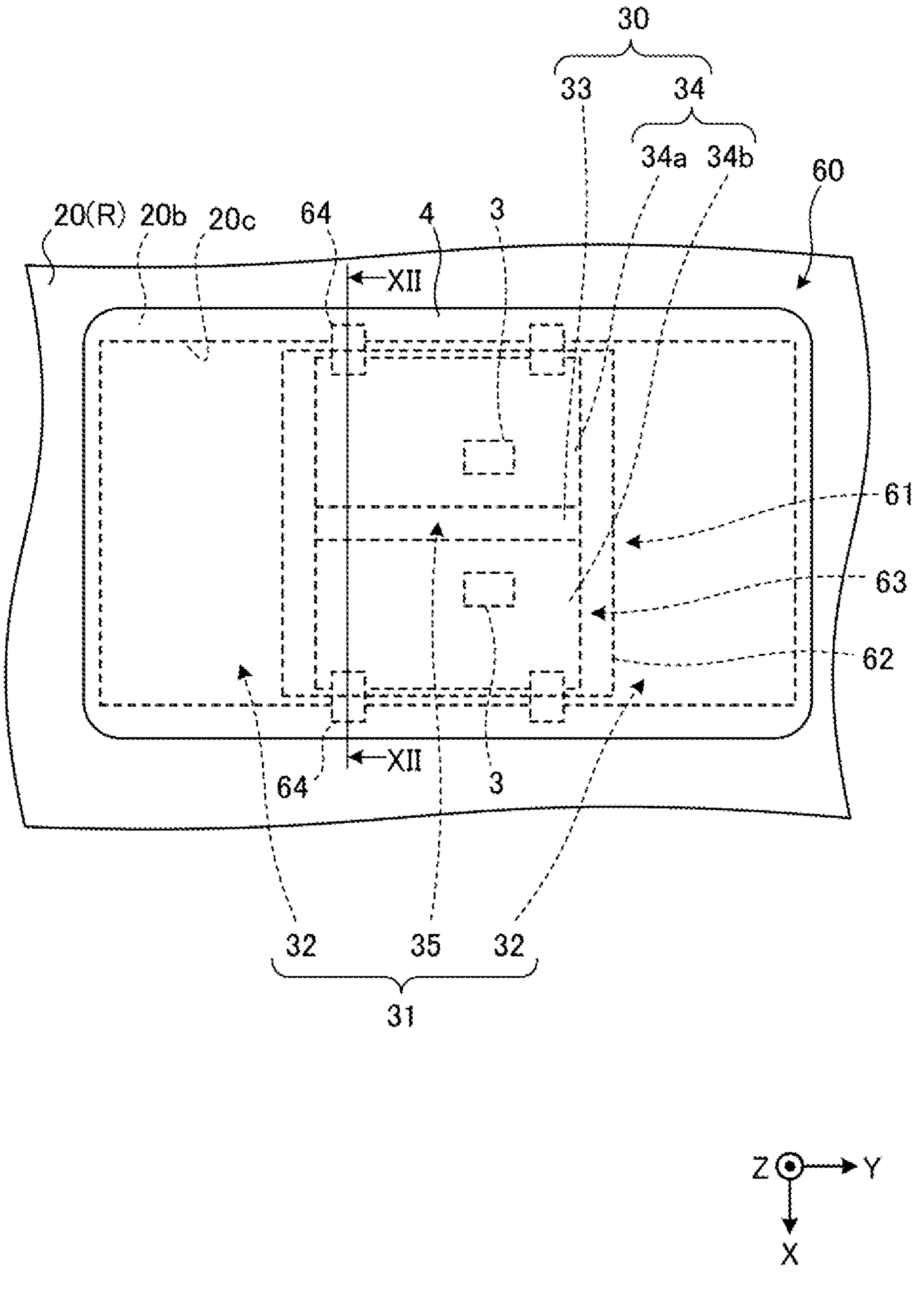
FIG. 11 is a plan view schematically showing an antenna device according to a second embodiment.
Figure 12:
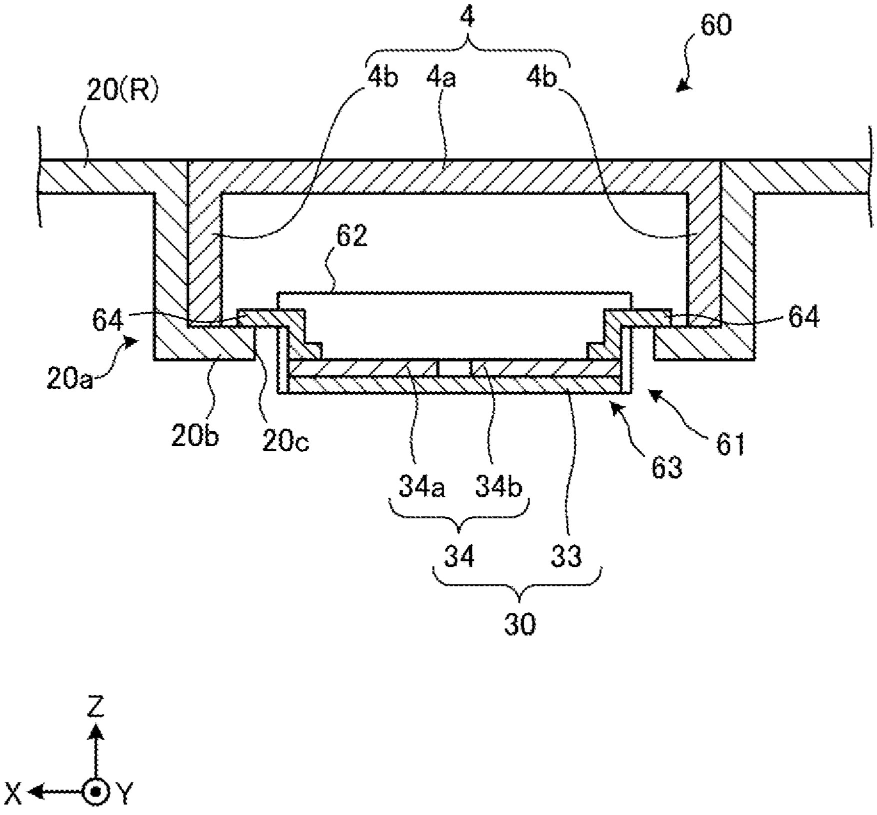
FIG. 12 is a cross-sectional view taken along a line XII-XII of FIG. 11.

Next, a configuration example of an antenna device 60 according to a second embodiment will be described with reference to FIGS. 11 and 12. The antenna device 60 is mounted on the roof R of the vehicle C similarly to the slot antenna 1. FIG. 11 is a plan view schematically showing the antenna device 60 according to the second embodiment. FIG. 12 is a cross-sectional view taken along a line XII-XII of FIG. 11. The antenna device 60 according to the second embodiment will be described focusing on differences from the first embodiment. The same components as those of the first embodiment are denoted by the same reference numerals as those of the first embodiment.

The antenna device 60 includes an antenna unit 61 and the cover 4. The antenna unit 61 is provided at the opening portion 20*c* formed in the recess portion 20*a* of the metal sheet 20.

The antenna unit 61 is accommodated in a case 62. The case 62 is made of a dielectric. The case 62 is made of resin, for example. The antenna unit 61 is provided at the opening portion 20*c* in a state of being accommodated in the case 62.

The antenna unit 61 includes a slot antenna element 63 and an antenna amplifier. The slot antenna element 63 includes the conductor plate 30 in which the slot 31 is formed, the feeding points 3, and the like. The antenna amplifier includes a receiving circuit that converts radio waves acquired by the feeding points 3 into electric signals.

The antenna unit 61 is supported by the metal sheet 20 via brackets 64. The brackets 64 includes a metal bracket. The conductor pattern 34 of the conductor plate 30 is electrically connected to the metal sheet 20 by the metal brackets 64. The conductor plate 30 is electrically connected to the metal sheet 20, is provided at the opening portion 20*c*, and is flush with the opening portion 20*c*.

At least a part of the slot 31 extending in the longitudinal direction (Y-axis direction) of the opening portion 20*c* is formed in the conductor plate 30. As shown in FIG. 11, the slot 31 formed in the conductor plate 30 is the slit 35 formed linearly along the longitudinal direction of the opening portion 20*c*.

The slot 31 formed in the conductor plate 30 may be the L-shaped slit 42 as shown in FIG. 10. Further, as shown in FIG. 6, the slot 31 in the antenna unit 61 may be the substantially dumbbell-shaped slot 22 formed at the conductor plate 21.

The antenna device 60 includes an antenna unit 61 and the cover 4. The antenna unit 61 is provided at the opening portion 20*c* of the metal sheet 20 constituting the outer plate of the vehicle C, and includes the slot antenna element 63. The cover 4 is made of a dielectric and covers the outer surface side of the opening portion 20*c*.

Accordingly, in the antenna device 60, the antenna unit 61 can be prevented from protruding from the vehicle C. The antenna device 60 can prevent the appearance of the vehicle C from being impaired and improve the aesthetic appearance of the vehicle C. By attaching the antenna unit 61 to the opening portion 20*c*, the antenna device 60 can be assembled, and the assembling work of the antenna device 60 is facilitated.

The slot antenna element 63 includes the conductor plate 30 electrically connected to the metal sheet 20 and flush with the opening portion 20*c*. At least a part of the slot 31 extending in the longitudinal direction of the opening portion 20*c* is formed in the conductor plate 30.

Since the slot antenna is formed by attaching the antenna unit 61 including the conductor plate 30 in which the slot 31 is formed to the opening portion 20*c*, the assembly work of the antenna device 60 is facilitated. Further, by making the conductor plate 30 flush with the opening portion 20*c*, the antenna unit 61 of the antenna device 60 can be prevented from protruding from the vehicle C. Therefore, the antenna device 60 can prevent the appearance of the vehicle C from being impaired and improve the aesthetic appearance of the vehicle C.

The antenna device 60 may include a plurality of antenna units. The plurality of antenna units are provided at the opening portion 20*c*. The plurality of antenna units include antenna units capable of receiving broadcast waves of different frequency bands. For example, one antenna unit is an antenna unit that receives broadcast waves such as FM radio broadcast, and other antenna units are antenna units that receive radio waves such as V2X.

Figure 13:
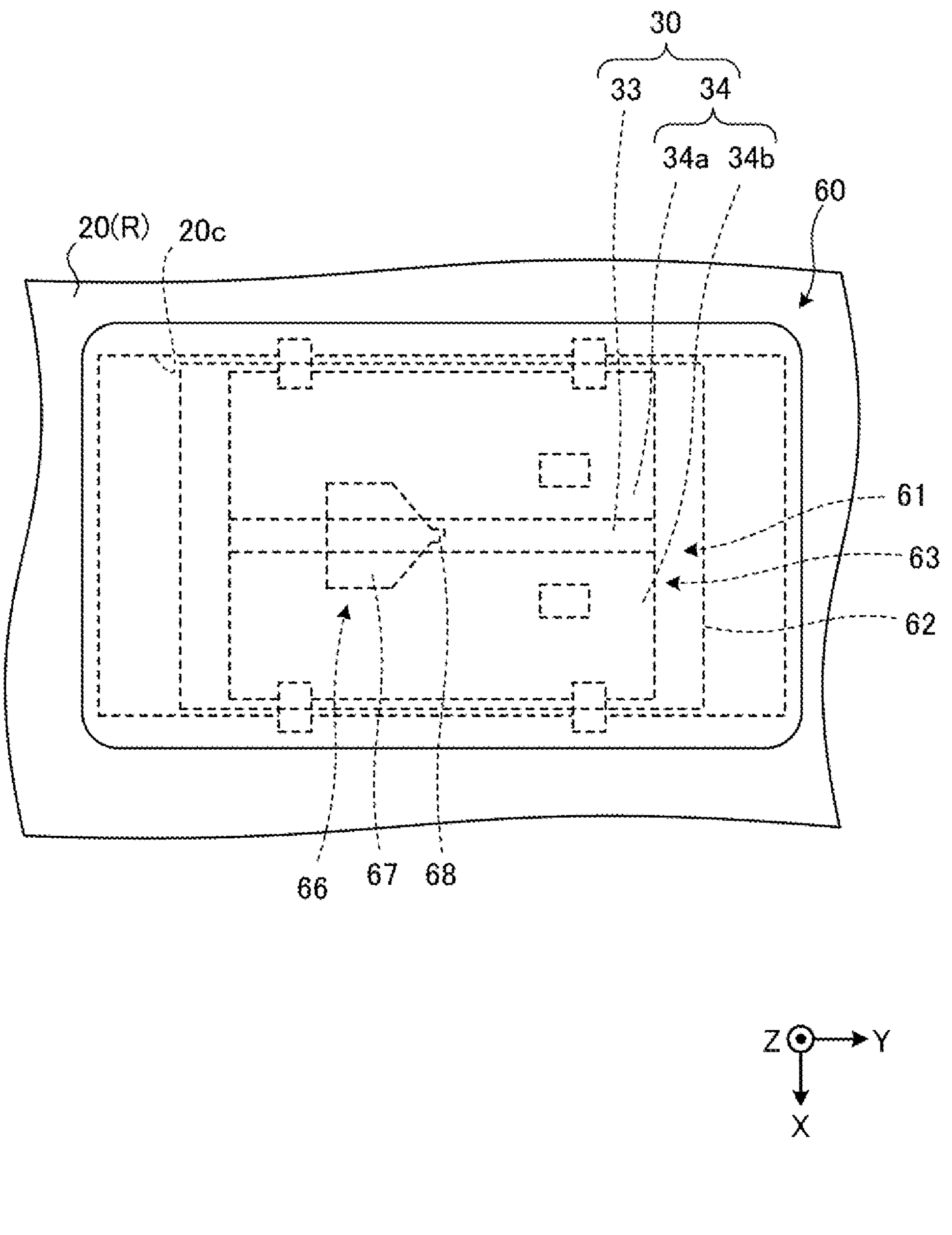
FIG. 13 is a plan view schematically showing an antenna device including a plurality of antenna units.

For example, as shown in FIG. 13, the plurality of antenna units include the antenna unit 61 including the slot antenna element 63; and a plate antenna unit 66. FIG. 13 is a plan view schematically showing the antenna device 60 including a plurality of antenna units, that is, the antenna units 61 and 66.

The plate antenna unit 66 is provided, for example, above the conductor plate 30 of the antenna unit 61. The plate antenna unit 66 receives radio waves by, for example, an antenna part 67 having a home base shape. In the plate antenna unit 66, a feeding point is provided at a vertex 68 of a triangular shape of the home base shape. In the antenna device 60, a distance between the plate antenna unit 66 and the conductor plate 30 of the antenna unit 61 in a Z-axis direction is a predetermined distance (for example, 5 mm) or more, and thus antenna performance adverse effects on the conductor plate 30 caused by the plate antenna unit 66 can be avoided.

A conductor plate of the antenna unit 61 may be the conductor plate 21 shown in FIG. 6 or the conductor plate 40 shown in FIG. 10.

Figure 14:
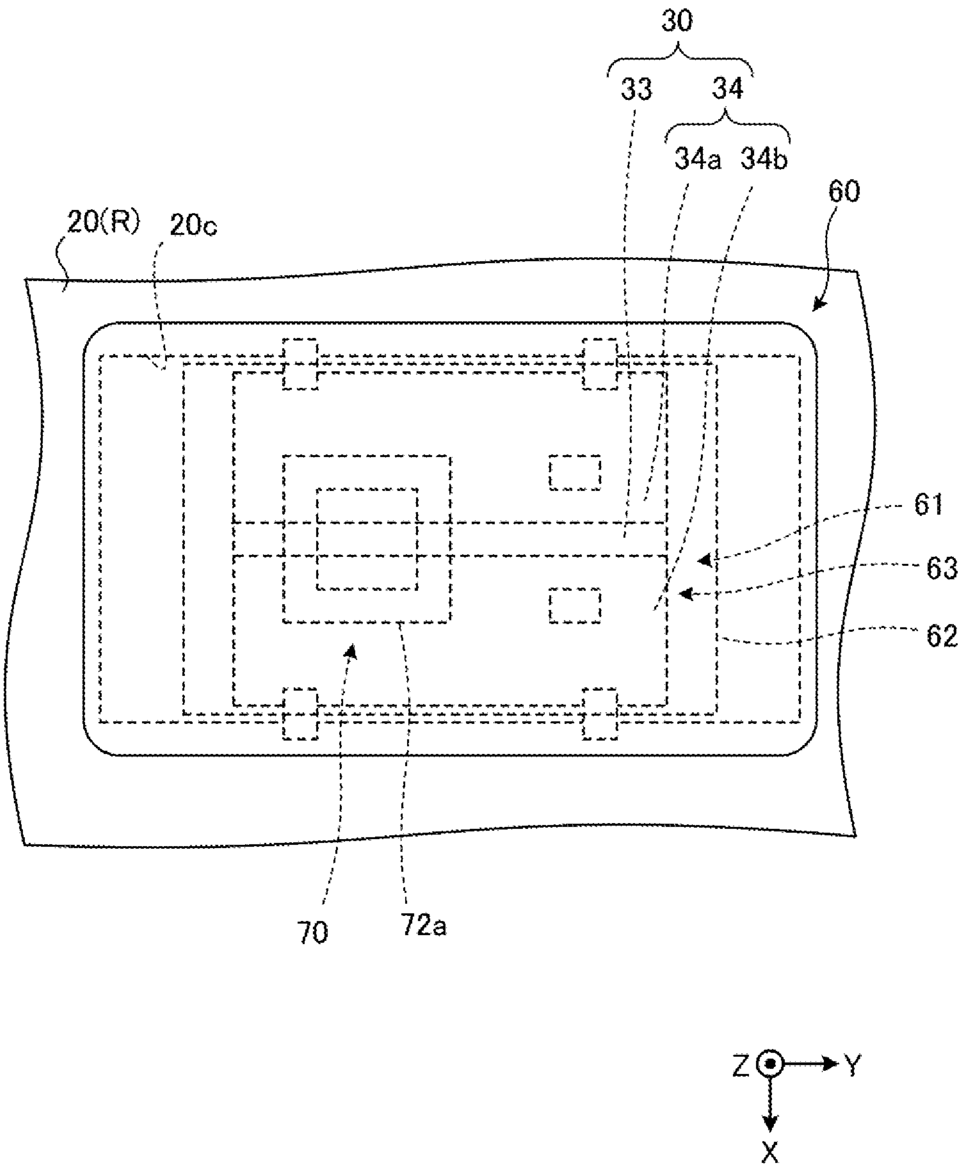
FIG. 14 is a plan view schematically showing an antenna device including a plurality of antenna units.

As shown in FIG. 14, the plurality of antenna units may include the antenna unit 61 including the slot antenna element 63; and a tubular antenna unit 70. FIG. 14 is a plan view schematically showing the antenna device 60 including a plurality of antenna units, that is, the antenna units 61 and 70.

Figure 15:
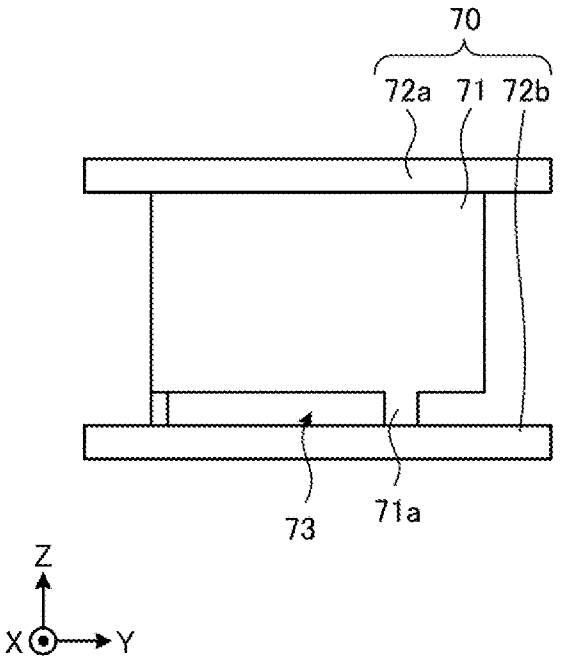
FIG. 15 is a side view schematically showing a tubular antenna unit.

The tubular antenna unit 70 is provided, for example, above the conductor plate 30 of the antenna unit 61. The tubular antenna unit 70 is formed, for example, in a rectangular shape in a plan view. As shown in FIG. 15, the tubular antenna unit 70 includes a tubular conductor 71 and plate-shaped conductors 72*a* and 72*b*. FIG. 15 is a side view schematically showing the tubular antenna unit 70.

The tubular conductor 71 extends in the Z-axis direction. The plate-shaped conductors 72*a* and 72*b* extend in the X-axis and Y-axis directions from end portions of the tubular conductor 71. The plate-shaped conductors 72*a* and 72*b* are spaced apart in the Z-axis direction. In the tubular antenna unit 70, a slot 73 is formed along a peripheral direction of the tubular conductor 71.

A part 71*a* of the tubular conductor 71 passes through a through hole formed in the plate-shaped conductor 72*b* without being in contact with the plate-shaped conductor 72*b*. The part 71*a* of the tubular conductor 71 functions as a feeding point. The feeding point is also connected to the plate-shaped conductor 72*b* in which the through hole is formed. The feeding points may be disposed on both sides of the slot 73 in a width direction thereof (Z-axis direction).

In the antenna device 60, a distance between the tubular antenna unit 70 and the conductor plate 30 in the Z-axis direction is a predetermined distance (for example, 5 mm) or more, and thus antenna performance adverse effects on the conductor plate 30 caused by the tubular antenna unit 70 can be avoided.

The plate antenna unit 66 or the tubular antenna unit 70 may be provided at the space 32 in the antenna unit 61 including the slot antenna element 63.

The antenna device 60 includes a plurality of antenna units. The plurality of antenna units are provided at the opening portion 20*c* of the metal sheet 20 constituting the outer plate of the vehicle C. The plurality of antenna units include at least one of the plate antenna unit 66 and the tubular antenna unit 70.

Accordingly, the antenna device 60 can receive radio waves of different frequency bands by the plurality of antenna units. Further, in the antenna device 60, the plurality of antenna units can be collectively provided at the opening portion 20*c*.

In the antenna device 60, the plurality of antenna units may be covered with a single cover 4.

Accordingly, in the antenna device 60, the opening portion 20*c* provided at the metal sheet 20 which is the outer plate can be minimized. Further, in the antenna device 60, the number of members such as the cover 4 can be reduced. Therefore, the antenna device 60 is advantageous in ease of processing and cost reduction.

Third Embodiment

Figure 16:
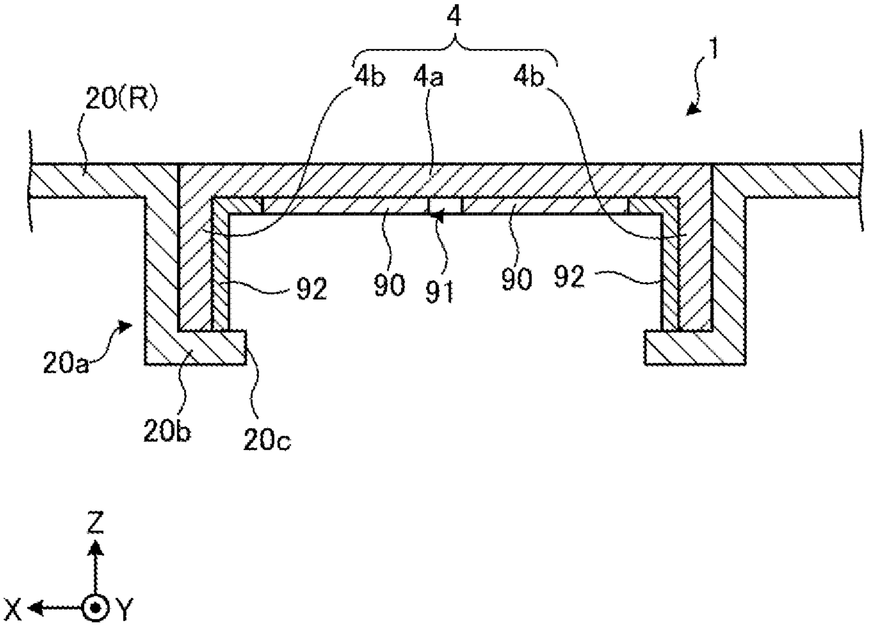
FIG. 16 is a cross-sectional view schematically showing a slot antenna according to a third embodiment.

Next, a configuration example of the slot antenna 1 according to a third embodiment will be described with reference to FIG. 16. FIG. 16 is a cross-sectional view schematically showing the slot antenna 1 according to the third embodiment. The slot antenna 1 according to the third embodiment will be described focusing on differences from the first embodiment. The same components as those of the first embodiment are denoted by the same reference numerals as those of the first embodiment.

In the slot antenna 1, a conductor pattern 90 is formed on the vehicle interior side of the vehicle C with respect to the cover 4. The conductor pattern 90 is laminated on the cover 4 made of a dielectric. In the conductor pattern 90, a slot 91 is formed. That is, in the slot antenna 1, the slot 91 is formed in a surface of the cover 4 on the vehicle interior side. The conductor pattern 90 is conductively connected to the metal sheet 20 by wirings 92. That is, the conductor pattern 90 is electrically connected to the metal sheet 20. The cover 4 covers the opening portion 20*c* of the metal sheet 20.

The conductor pattern 90 is formed, for example, by applying a conductive paint to the surface (the surface on the vehicle interior side) of the cover 4. Further, the conductor pattern 90 may be formed by, for example, attaching a metal foil of copper, aluminum or the like to the surface of the cover 4. The conductor pattern 90 may be formed by, for example, attaching a metal sheet of copper, aluminum, or the like to the surface of the cover 4. The conductor pattern 90 may be, for example, a vapor deposition film obtained by vacuum-depositing copper, aluminum, or the like on the surface of the cover 4.

The conductor pattern 90 may be formed by, for example, forming a pattern on a surface of a flexible plastic film with a conductive paint and attaching the pattern to the surface of the cover 4. The conductor pattern 90 may be formed by, for example, forming a pattern on a surface of a flexible plastic film with a vapor deposition film and attaching the pattern to the surface of the cover 4.

The conductor pattern 90 may be formed on the vehicle exterior side of the vehicle C with respect to the cover 4 as long as the conductor pattern 90 is thin as the conductive paint and the vapor deposition film. In this case, durability of the conductor pattern 90 can be improved by further applying a coating or the like to the conductor pattern 90 from above.

The slot antenna 1 includes the cover 4 and the conductor pattern 90. The cover 4 covers the opening portion 20*c* provided at the metal sheet 20 constituting the outer plate of the vehicle C, and is made of a dielectric. The conductor pattern 90 is formed on the cover 4. In the conductor pattern 90, a slot 91 is formed.

Accordingly, in the slot antenna 1, the slot 91 is provided at the cover 4 itself. Therefore, in the slot antenna 1, the slot antenna can be formed without separately disposing the conductor plate 21 or the like in the opening portion 20*c*. The slot antenna 1 has a simplified structure, and can be processed and assembled easily. Further, the slot antenna 1 is advantageous in reducing the number of components and cost.

Figure 17:
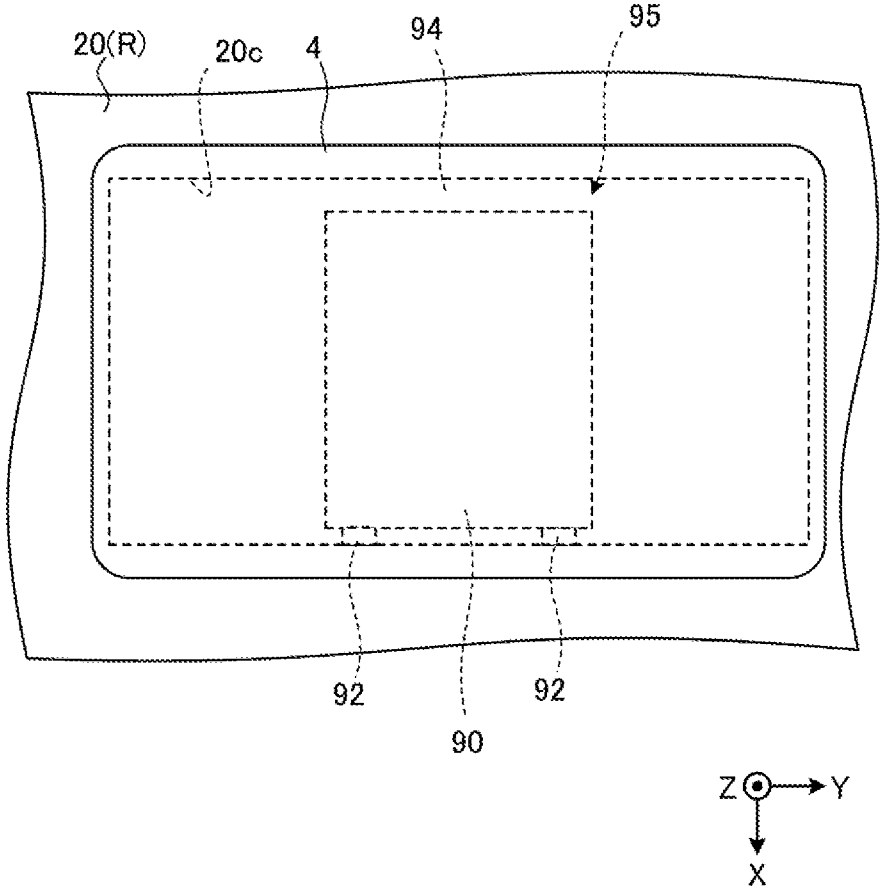
FIG. 17 is a plan view schematically showing a slot antenna according to a modification.

As another example, as shown in FIG. 17, the conductor pattern 90 is positioned at an intermediate portion in the longitudinal direction of the opening portion 20*c* of the metal sheet 20, and a gap 94 is provided between the conductor pattern 90 and an edge of the opening portion 20*c*. Both end portions of the opening portion 20*c* in the longitudinal direction in which the conductor pattern 90 is not disposed are connected by the gap 94 between the conductor pattern 90 and the opening portion 20*c*, and as a whole, a slot 95 in which a central portion is narrow and both end portions are wide is formed. That is, the slot 95 is formed by the opening portion 20*c* and the conductor pattern 90. At least a part of the slot 95 is formed by the gap 94 between the edge of the opening portion 20*c* and the conductor pattern 90. The slot antenna 1 is an antenna in which the slot 95 functions as an antenna element. FIG. 17 is a plan view schematically showing the slot antenna 1 according to a modification.

Accordingly, in the slot antenna 1, the conductor pattern 90 provided at the cover 4 and the opening portion 20*c* of the metal sheet 20 form the slot 95 as a whole. Therefore, in the slot antenna 1, the slot antenna can be formed without separately disposing the conductor plate 21 or the like in the opening portion 20*c*. The slot antenna 1 has a simplified structure, and can be processed and assembled easily. Further, the slot antenna 1 is advantageous in reducing the number of components and cost.

Figure 18:
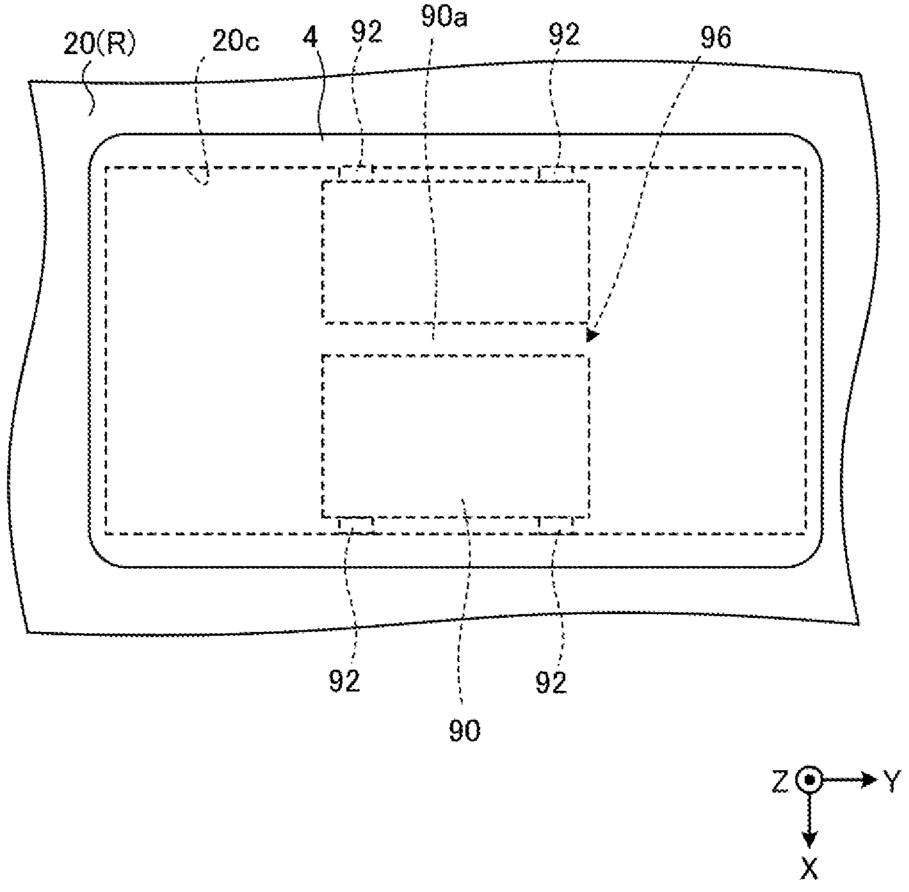
FIG. 18 is a plan view schematically showing a slot antenna according to a modification.

As another example, as shown in FIG. 18, the conductor pattern 90 is positioned at an intermediate portion in the longitudinal direction of the opening portion 20*c* of the metal sheet 20, and a groove (slit) 90*a* is provided at the conductor pattern 90. Both end portions of the opening portion 20*c* in the longitudinal direction in which the conductor pattern 90 is not disposed are connected by the groove 90*a* provided in the conductor pattern 90, and as a whole, a slot 96 in which a central portion is narrow and both end portions are wide is formed. That is, at least a part of the slot 96 is formed by the groove 90*a* provided in the conductor pattern 90. The slot antenna 1 is an antenna in which the slot 96 functions as an antenna element. FIG. 18 is a plan view schematically showing the slot antenna 1 according to a modification.

Figure 19:
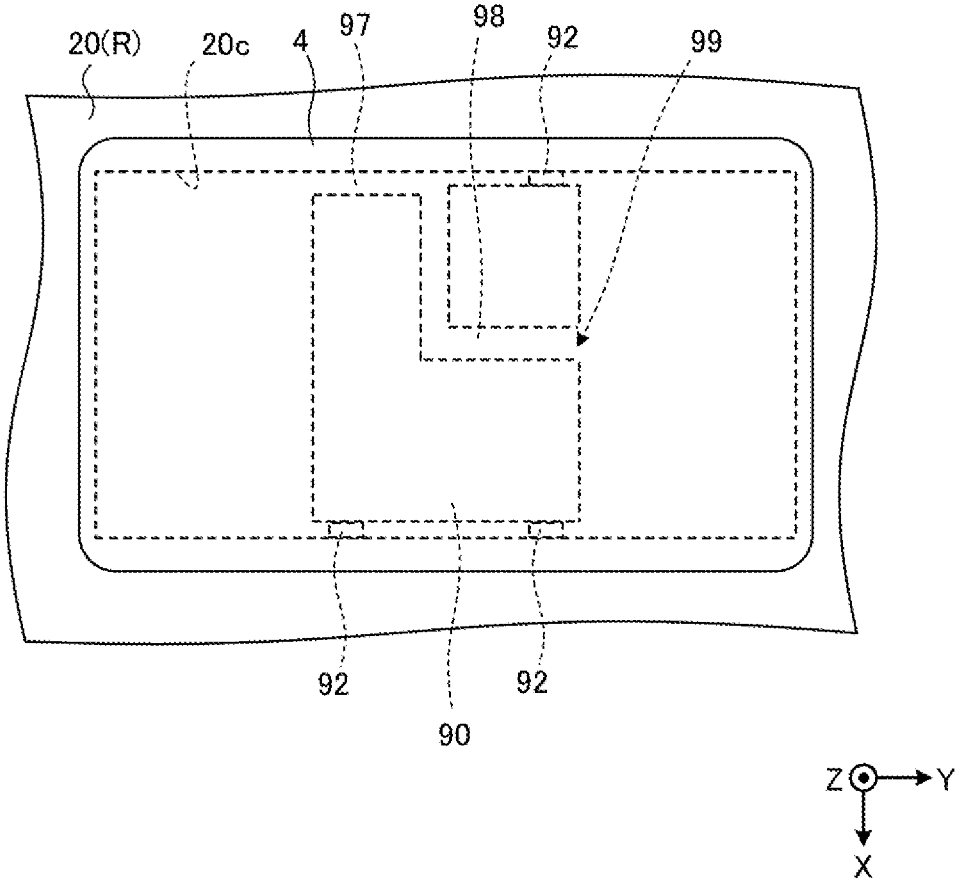
FIG. 19 is a plan view schematically showing a slot antenna according to a modification.

As still another example, as shown in FIG. 19, the conductor pattern 90 is positioned at an intermediate portion in the longitudinal direction of the opening portion 20*c* of the metal sheet 20, and a gap 97 is provided between the conductor pattern 90 and the edge of the opening portion 20*c*. Further, a groove (slit) 98 is provided in the conductor pattern 90. Both end portions of the opening portion 20*c* in the longitudinal direction in which the conductor pattern 90 is not disposed are connected by the gap 97 between the conductor pattern 90 and the opening portion 20*c* and the groove 98 provided in the conductor pattern 90. Accordingly, as a whole, a slot 99 in which a central portion is narrow and both end portions are wide is formed. The slot antenna 1 is an antenna in which the slot 99 functions as an antenna element. FIG. 19 is a plan view schematically showing the slot antenna 1 according to a modification.

In the slot antenna 1, the conductor pattern 90 provided in the cover 4 and the opening portion 20*c* of the metal sheet 20 form the slot 99 as a whole. Accordingly, in the slot antenna 1, the slot antenna can be formed without separately disposing the conductor plate 21 or the like in the opening portion 20*c*. The slot antenna 1 has a simplified structure, and can be processed and assembled easily. Further, the slot antenna 1 is advantageous in reducing the number of components and cost.

The slot antenna 1 and the antenna device 60 described above may have the following configurations.

A metal sheet may be provided on the vehicle interior side of the opening portion 20*c* of the metal sheet 20 constituting the outer plate of the vehicle C so as to face the opening portion 20*c*.

Accordingly, for example, noise in the vehicle interior can be prevented from being received by the slot antenna 1.

The slot antenna 1 and the antenna device 60 may be provided in a body of the vehicle C such as a back door and a pillar.

Further effects and modifications can be easily derived by those skilled in the art. Therefore, broader aspects of the present invention are not limited to the specific details and representative embodiments shown and described above. Therefore, various modifications can be made without departing from the spirit or scope of the general inventive concept as defined by the appended claims and equivalents thereof.

REFERENCE SIGNS LIST

1: slot antenna
2: slot portion
3: feeding point
4: cover
7, 13, 20: metal sheet
7*a*, 20*a*: recess portion
10, 20*c*: opening portion
11, 22, 31, 91, 95, 96, 99: slot
21, 30, 40: conductor plate
34, 41, 90: conductor pattern
35, 42: slit
42*a*: first slit
42*b*: second slit
43: third slit
60: antenna device
61: antenna unit
62: case
63: slot antenna element
66: plate antenna unit
70: tubular antenna unit
94, 97: gap
90*a*, 98: groove
C: vehicle

What is claimed is:

1. A slot antenna comprising:
a slot, which is an opening having a slit shape, formed at a plane metal sheet that is a part of a vehicle body;
an electric power supply portion (i) that is disposed at a recess portion of the metal sheet, which is recessed toward a vehicle interior side of the vehicle, and (ii) that supplies electric power to the slot; and
a cover that is provided to cover the opening and to close the recess portion, wherein
the opening is provided at a bottom surface of the recess portion.

2. The slot antenna according to claim 1, wherein
the cover has a U-shaped cross section comprising an upper surface portion and a side wall portion, and
the side wall portion is fitted into the recess portion to close the recess portion.

3. The slot antenna according to claim 2, wherein the upper surface portion of the cover is flush with an outer plate of the vehicle.

4. The slot antenna according to claim 2, wherein
the recess portion comprises, at an edge of the recess portion, a stepped portion in which a depth of the recess portion increases stepwise, and the cover is fitted into the stepped portion to close the recess portion.

5. The slot antenna according to claim 1, wherein the metal sheet at which the opening is provided constitutes a roof of the vehicle.

6. The slot antenna according to claim 1, wherein a plurality of antenna elements are provided at the opening, the plurality of antenna elements are covered with the cover, and the cover is a single cover.

7. The slot antenna according to claim 1, wherein the cover comprises a conductor pattern electrically connected to the metal sheet, and the slot is formed by the opening and the conductor pattern.

8. The slot antenna according to claim 7, wherein at least a part of the slot is formed by a gap between an edge of the opening and an edge of the conductor pattern.

9. The slot antenna according to claim 7, wherein the conductor pattern includes a first conductor pattern and a second conductor pattern, each of the first conductor pattern and the second conductor pattern are electrically connected to the metal sheet, and at least a part of the slot is formed by a gap between the first conductor pattern and the second conductor pattern.

* * * * *